US011234001B2

(12) United States Patent
Day et al.

(10) Patent No.: US 11,234,001 B2
(45) Date of Patent: Jan. 25, 2022

(54) SYSTEMS AND METHODS FOR ENHANCED VIDEO ENCODING

(71) Applicant: DISH Technologies L.L.C., Englewood, CO (US)

(72) Inventors: Christopher Day, Denver, CO (US); Rima Shah, Thornton, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 679 days.

(21) Appl. No.: 15/666,855

(22) Filed: Aug. 2, 2017

(65) Prior Publication Data

US 2019/0045191 A1  Feb. 7, 2019

(51) Int. Cl.

| | |
|---|---|
| *H04N 19/136* | (2014.01) |
| *H04N 19/132* | (2014.01) |
| *H04N 19/196* | (2014.01) |
| *H04N 19/184* | (2014.01) |
| *H04N 19/103* | (2014.01) |

(Continued)

(52) U.S. Cl.
CPC ....... *H04N 19/136* (2014.11); *G06K 9/00724* (2013.01); *G06K 9/4604* (2013.01); *G06K 9/66* (2013.01); *H04N 19/103* (2014.11); *H04N 19/132* (2014.11); *H04N 19/14* (2014.11); *H04N 19/177* (2014.11); *H04N 19/184* (2014.11); *H04N 19/196* (2014.11); *H04N 19/40* (2014.11); *G06F 16/783* (2019.01)

(58) Field of Classification Search
CPC .. H04N 19/136; H04N 19/177; H04N 19/103; H04N 19/14; G06K 9/66; G06K 9/4604

USPC ..................................... 375/240.08
See application file for complete search history.

(56) References Cited

U.S. PATENT DOCUMENTS

| | | |
|---|---|---|
| 8,542,319 B1 | 9/2013 | Faroudja |
| 8,831,354 B1 | 9/2014 | Faroudja et al. |

(Continued)

FOREIGN PATENT DOCUMENTS

| | | |
|---|---|---|
| EP | 3 073 738 A1 | 9/2016 |
| WO | 2016/181150 A1 | 11/2016 |
| WO | 2017/085708 A1 | 5/2017 |

OTHER PUBLICATIONS

Milani et al., "A saliency-based rate control for people detection in video," 2013 IEEE International Conference on Acoustics, Speech and Signal Processing; pp. 2016-2020; 2013.

(Continued)

*Primary Examiner* — Jared Walker
(74) *Attorney, Agent, or Firm* — Seed IP Law Group LLP

(57) ABSTRACT

Systems and methods for enhanced video encoding identify patterns in sequences of raw digital video frames to extract features and identify the type of content represented by the extracted features. The system simulates many outcomes of encoding the sequence of digital video frames by using various different encoding strategies to find the relative best encoding strategy for each sequence of frames. As the encoder processes video, it passes digital video frames to a modeling system which determines whether the video, or video having that same type of content, has been previously observed by the system. The system then selectively applies a saved encoding strategy that had been determined by the system to be particularly suitable for encoding the same sequence of video frames or that same type of content.

15 Claims, 7 Drawing Sheets

(51) Int. Cl.
  *H04N 19/14* (2014.01)
  *H04N 19/177* (2014.01)
  *G06K 9/00* (2006.01)
  *H04N 19/40* (2014.01)
  *G06K 9/46* (2006.01)
  *G06K 9/66* (2006.01)
  *G06F 16/783* (2019.01)

(56) References Cited

U.S. PATENT DOCUMENTS

| | | |
|---|---|---|
| 8,929,446 B1 | 1/2015 | Faroudja et al. |
| 9,503,738 B2 | 11/2016 | Carmel et al. |
| 9,521,358 B2 | 12/2016 | Possos et al. |
| 9,635,387 B2 | 4/2017 | Carmel et al. |
| 2001/0017887 A1* | 8/2001 | Furukawa ............ H04N 19/139 375/240.03 |
| 2007/0279494 A1* | 12/2007 | Aman ................... G01S 3/7864 348/169 |
| 2013/0114697 A1* | 5/2013 | Siddaramanna ..... H04N 19/107 375/240.03 |
| 2015/0092855 A1* | 4/2015 | Chou ................... H04N 19/105 375/240.16 |
| 2016/0205407 A1 | 7/2016 | Carmel et al. |
| 2016/0221190 A1* | 8/2016 | Aloimonos ............ B25J 9/1661 |
| 2016/0253883 A1* | 9/2016 | Westmacott ........... H04N 7/181 348/159 |
| 2017/0104993 A1 | 4/2017 | Jeong et al. |

OTHER PUBLICATIONS

International Search Report and Written Opinion for International Application PCT/US2018/044685, dated Oct. 22, 2018, 16 pages.
International Preliminary Report on Patentability for PCT/US2018/044685, dated Feb. 4, 2020, 10 pages.

* cited by examiner

SYSTEMS AND METHODS FOR ENHANCED VIDEO ENCODING

TECHNICAL FIELD

The technical field relates to digital video, and particularly to providing systems and methods for enhanced digital video encoding.

BRIEF SUMMARY

Video encoding is the process of converting digital video files from one format to another. Video encoding is also known as "transcoding" or "video conversion." At the time of recording, a device gives the video file a particular format and other specifications. A content provider uses a digital video encoding process to convert this original source raw video so that it is viewable on various output formats and/or to compress the video file for transmission, or to otherwise save bandwidth. In particular, video compression may encode the video in a manner to reduce the size of the digital video such that it doesn't take such a long time to upload/download or consume such a large amount of bandwidth when broadcasting or streaming. As technology improves, Internet connections are getting better and faster, but at the same time video files are getting higher in resolution and thus bigger, so compression is a vital step in broadcasting or streaming digital video over the Internet and other communication channels, especially when such activities must occur in real-time, such as with many digital video streaming applications. When compared to multi-pass encoding, which is often too slow for real-time encoding environments, real-time video encoding suffers from high bandwidth usage and poor picture quality. While some content is truly live and unique, most video contains repeating elements or sequences of elements which are encoded inefficiently. This presents challenges to content providers who need to offer video of increasing quality with finite bandwidth.

The systems and methods described herein help to solve this problem by identifying patterns in sequences of raw digital video frames and simulating many outcomes of encoding the sequence of digital video frames by using various different encoding strategies to find the relative best encoding strategy for each sequence of frames. The system selectively applies a saved encoding strategy that was previously determined by the system to be particularly suitable to encode that sequence of video frames, or to encode the type of content represented by that sequence of video frames. The system uses a machine learning process to train itself by encoding various sequences of video frames using various encoding strategies. The system may determine the type of content represented by the sequence of digital video frames by extracting features from the sequence of video frames as it is received. Each time the same sequence of video frames (or a sequence of video frames having the same type of identified content) is encountered, that sequence of video frames is encoded using a different encoding strategy in the machine learning process until the various available encoding strategies are tested. Comparing the results, the system then selects the encoding strategy that performed the relative best on that same sequence of video frames, or on the sequence of video frames having the same type of identified content, based on predetermined performance criteria. The system then uses this selected encoding strategy to use going forward when it encounters the same sequence of video frames, or a sequence of video frames having the same type of identified content, to increase efficiency and quality of the video encoding process.

BRIEF DESCRIPTION OF THE DRAWINGS

The components in the drawings are not necessarily to scale relative to each other. Like reference numerals designate corresponding parts throughout the several views.

DETAILED DESCRIPTION

Systems and methods for enhanced video encoding include various example embodiments which convert digital video frames to data objects (referred to herein as "observations") represented by a received sequence of frames and inputs these observations to a flexible, continually enriched machine learning system which independently extracts features represented by the objects. In particular, various example embodiments identify patterns in sequences of raw digital video frames and simulate many outcomes of encoding the sequence of digital video frames by using various different encoding strategies to find the relative best encoding strategy for each sequence of frames. As the encoder processes video, it may pass digital video frames to a modeling system which determines whether the video has been previously observed by the system. The system then selectively applies a saved encoding strategy to encode the sequence of video frames based on whether the system had determined the video had been previously observed by the system. Each time the same sequence of video frames, or a sequence of video frames having the same type of identified content, is encountered, it is encoded using a different encoding strategy until the various encoding strategies are tested. Comparing the results, the system then selects the encoding strategy that performed the relative best on that same sequence of video frames, or on a sequence of video frames having the same type of identified content, based on predetermined performance criteria. The system then uses this selected encoding strategy going forward when it encounters the same sequence of video frames, or a sequence of video frames having the same type of identified content.

Figure 1:
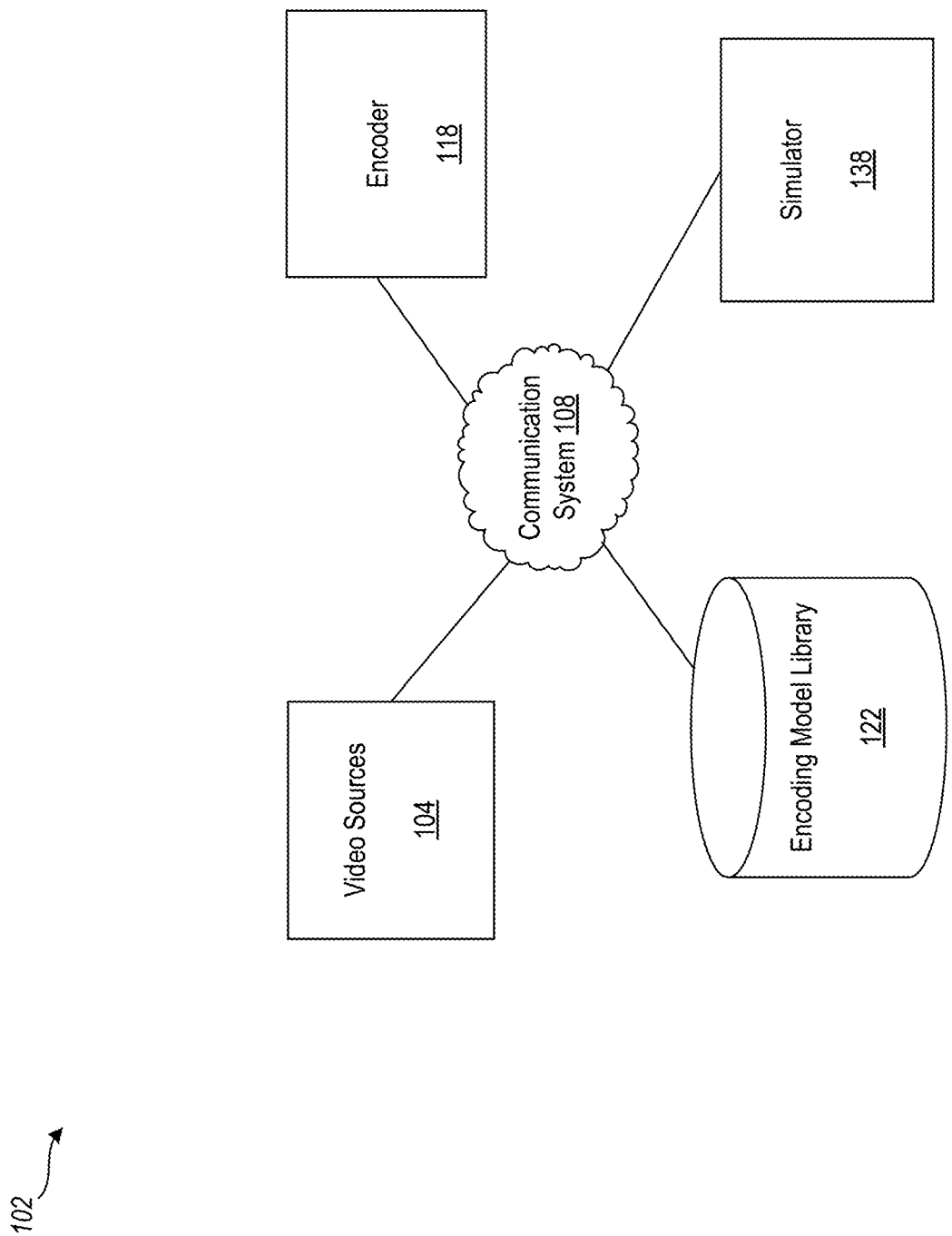
FIG. 1 is an overview block diagram illustrating an example environment in which embodiments of systems and methods for enhanced video encoding may be implemented, according to one example embodiment.

FIG. 1 is an overview block diagram illustrating an example environment in which embodiments of systems and methods for enhanced video encoding may be implemented, according to one example embodiment.

Before providing additional details regarding the operation and constitution of systems and methods for enhanced video encoding, the example implementation environment 102, within which such a system may operate, will briefly be described.

In the content distribution environment 102, audio, video, and/or data service providers, such as television service providers, provide their customers a multitude of video and/or data programming (hereafter, collectively and/or exclusively "programming"). Also, such programming may originate from other sources such as media players or other local or remote storage devices. The programming may include any type of media content, including, but not limited to: television shows, news, movies, sporting events, advertisements, etc. In various embodiments, any of this programming may be provided as a type of programming referred to as streaming media content, which is generally digital multimedia data that is substantially constantly received by and presented to an end-user or presented on a device while being delivered by a provider from a stored file source. Its verb form, "to stream", refers to the process of delivering media in this manner. The term refers to how the media is delivered rather than the media itself. The various sources of such programming are represented by video sources 104.

The encoder interconnects to one or more communications media or video sources 104. For example, the various media content may be delivered as data using the Internet protocol (IP) suite over a packet-switched network such as the Internet or other packet-switched network. The underlying connection carrying such data may be via a cable head-end, satellite antenna, telephone company switch, cellular telephone system, Ethernet portal, off-air antenna, or the like. In one example embodiment, the encoder 118 is part of, or in communication with, the various devices that constitute the video sources 104 and may receive a plurality of programming by way of the communications media or video sources 104, or may only receive programming via a particular channel or source.

In some example embodiments, the encoder 118 may be configured to receive and encode digital video content according to various digital video compression routines to conserve bandwidth usage, implement digital rights management (DRM) and/or implement other access control technologies and architectures as part of the process of providing enhanced video encoding streaming media content on-demand to a receiving device (not shown). This encoding may be performed in real-time, such as to provide on-demand digital video streaming services to various customers and/or broadcast television services.

One example of one of the video sources 104 is a content provider or a program distributor which provides program content, such as television content. Example content providers include television stations which provide local or national television programming and special content providers which provide premium based programming, pay-per-view programming, on-demand and/or streaming programming.

Program content (i.e., a program including or not including advertisements), may be communicated to the encoder 118 through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of, the Internet, cable systems, fiber optic systems, telephone systems, microwave systems, asynchronous transfer mode ("ATM") systems, frame relay systems, digital subscriber line ("DSL") systems, radio frequency ("RF") systems, cellular systems, and satellite systems. In some embodiments, the encoder is part of the hardware or other system of the video sources 104 and in such embodiments, the communication system 108 may be a communication bus on a printed circuit board on which the encoder is located or implemented. In at least one embodiment, the received program content may be converted into a suitable signal (a "program signal") that is ultimately communicated to the encoder 118. Various embodiments of the encoder 118 may instead receive programming from program distributors and/or directly from content providers which are included as video sources 104 via locally broadcast RF signals, cable, fiber optic, Internet media, or the like via the communication system 108.

For example, Video on Demand (VOD) systems may allow a user to select, watch and/or listen to video and audio content on demand. For example "Internet Television" and "Internet Protocol Television" (IPTV) and systems of streaming media content providers are systems through which various media content is delivered using the Internet protocol (IP) suite over a packet-switched network such as the Internet represented by communication system 108 to the encoder 118, instead of being delivered through traditional channels using terrestrial, satellite signal, and cable television formats of the communication system 108. In various example embodiments, such technologies are deployed within environment 102 such as in subscriber-based telecommunications networks of the communication system 108 with high-speed access channels into a customer premises via the encoder 118 (e.g., into a set-top box or other customer-premises equipment) to bring VOD services to the customer.

In various example embodiments, television VOD systems stream media content via the communications system 108 from files stored at the video sources 104. The video sources 104 may also comprise multiple separate storage facilities and streaming media content servers geographically separated from each other, each of which streams stored media content to the encoder 118.

Television VOD systems may stream content to the encoder which may then stream encoded video to a receiving device such as a set-top box, DVD player, game system, smart phone, television (including a smart TV), PC, a sound system receiver, a digital video recorder ("DVR"), tablet device, mobile device or other computing device or media player, and the like, allowing viewing in real time, or download it to a receiving device such as a computer, DVR (also called a personal video recorder) or portable media player for viewing at any time. The content sources 104 may offer broadcast streaming, VOD streaming, including pay-per-view and free content, whereby a user buys or selects a movie or television program and it begins to play on a presentation device almost instantaneously, offer downloading of the media content via the encoder 118 to a DVR rented from the program distributor, and/or offer downloading, via the encoder 118, of the content onto a computer or mobile device, for viewing in the future.

Also, it may take significant processing power and time to encrypt the content at a sufficient level of quality with finite bandwidth. However, the systems and methods described herein for enhanced video encoding provide solutions which help overcome this difficulty and enable program distributors to more easily provide real-time encoding and increasing levels of picture quality within finite bandwidth. For example, simulator 138 is in operable communication over the communication system with the video sources 105, the encoder 118 and the encoding model library 122. Prior to the encoder 118 encoding a particular sequence of digital video frames, the simulator may be fed various sequences of raw digital video frames from the video sources 104. This is to identify patterns in these sequences of raw digital video frames and simulate many outcomes of encoding these sequences of digital video frames by using various different encoding strategies to find the encoding strategy particularly suitable for encoding each sequence of digital video frames, or to find the encoding strategy particularly suitable for encoding the type of content represented by each sequence of digital video frames. Each time the same sequence of video frames, or a sequence of video frames having the same type of identified content, is encountered by the simulator 138, it is encoded by the simulator 138 using a different encoding strategy until the various encoding strategies are tested. Comparing the results, the simulator 138 then selects the encoding strategy that performed the relative best on that same sequence of video frames, or on a sequence of video frames having the same type of identified content, based on predetermined performance criteria.

The simulator 138 may extract features represented within the sequences of video frames that are used to identify a type of content represented by the particular sequence of digital video frames, which is referred to herein as being "observed" by the system. The simulator 138 may store the various sequences of video frames that have been encoded using the various encoding strategies and/or store these extracted features and/or types of content associated with each sequence of video frames at the simulator 138, encoder 118 and/or the encoding model library 122. The simulator 138 may also store the encoding strategy identified as being particularly suitable for encoding the extracted features associated the identified type of content. This encoding strategy and the association of the encoding strategy with the extracted features and/or the identified type of content may be saved by the simulator 138 at the encoding model library 122. This encoding strategy and the association of the encoding strategy with the extracted features and/or the identified type of content may instead or also be saved at the simulator 138 or at the encoder 118.

As the encoder 118 processes video, it may pass digital video frames to the encoding model library 122 which determines whether the video has been previously observed by the system. The encoder 118 then selectively applies the saved encoding strategy to encode the sequence of video frames that was previously determined to be particularly suitable for encoding that same sequence of video frames or the type of content represented in that sequence of video frames. Until the system applies an encoding strategy that performs better for encoding that same sequence of video frames, or the type of content represented in that sequence of video frames, the encoder uses this selected encoding strategy going forward when it encounters the same sequence of video frames, or a sequence of video frames having the same type of identified content.

The various encoding strategies may include any number of currently available or subsequently developed encoding strategies, methods, processes, standards and/or algorithms including, but not limited to: encoding strategies that involve various digital video compression standards, including, but not limited to MPEG-1, MPEG-2, MPEG-4, MPEG-4 ASP, H.261, H.263, VC-3, WMV7, WMV8, MJPEG, MS-MPEG-4v3, MPEG-7, DV and Sorenson standards; encoding strategies that involve reducing color range; encoding strategies that involve uniform or targeted sharpness reduction; encoding strategies that involve frame duplication; encoding strategies that involve proactive bandwidth allocation (e.g., reducing bandwidth on other channels sharing the same conduit to preserve quality on a given channel); encoding strategies that involve adaptive bitrate video streaming; encoding strategies that involve lossy data compression, encoding strategies that involve lossless data compression; encoding strategies that involve simple bit compression; encoding strategies that involve motion estimation; encoding strategies that involve psycho-visual and motion summarization; encoding strategies that involve pre-filters; encoding strategies that involve post-filters; encoding strategies that involve vector quantization; encoding strategies that involve wavelet compression; and encoding strategies that involve discrete cosine transform algorithms.

The above description of the implementation environment 102, and the various devices therein, is intended as a broad, non-limiting overview of an example environment in which various embodiments of systems and methods for enhanced video encoding may be implemented. FIG. 1 illustrates just one example of an implementation environment 102 and the various embodiments discussed herein are not limited to such environments. In particular, implementation environment 102 and the various devices therein, may contain other devices, systems and/or media not specifically described herein. Also, various items shown in implementation environment 102 as being separate may in some embodiments be included within one item or device. For example, in some embodiments, the simulator 138 and the encoder 118 may be at one location or part of one device and/or share use of one or more processors, memories and/or other hardware components.

Example embodiments described herein provide applications, tools, data structures and other support to implement systems and methods for enhanced video encoding. Other embodiments of the described techniques may be used for other purposes, including systems and methods for enhanced video encoding implemented on various receiving and transmitting devices, such as set-top boxes, DVD players and recorders, digital recorders, computers, peripherals, televisions, mobile devices, smart phones, tablets, computer network equipment, digital video editing equipment and systems, digital video production systems, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
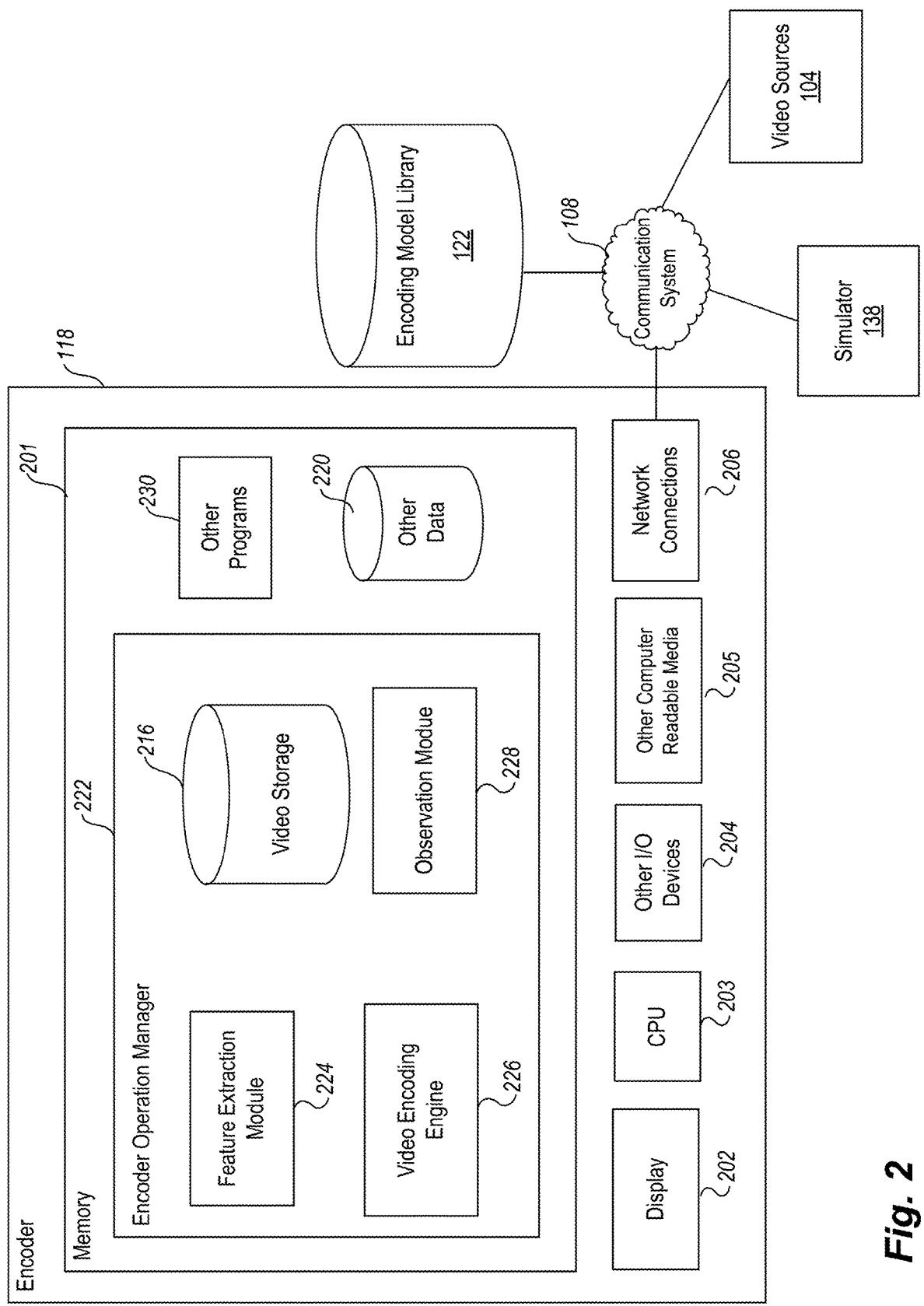
FIG. 2 is a block diagram illustrating elements of an example encoder used in systems and methods for enhanced video encoding, according to one example embodiment.

FIG. 2 is a block diagram illustrating elements of an example encoder 118 used in systems and methods for enhanced video encoding, according to one example embodiment.

In one embodiment, the encoder 118 is a device that converts digital video data from one format or code to another, for the purposes of standardization, speed or compression. In one example embodiment, the encoder 118 encodes a digital video data stream or a signal for transmission and storage, possibly in encrypted form. Some example applications for such encoding include broadcast media, videoconferencing, streaming media and video editing applications. The encoder 118 may also be a coder-decoder (codec) having additionally a decoder function that reverses the encoding for playback or editing. The encoder 118 may be configured to receive, process and output streaming media content programs and/or other programming such as cable or satellite television broadcasts via various other physical and logical channels of communication over communication system 108. In FIG. 2, the functionality of the encoder is 118 is stored in memory 201 as a software program or algorithm comprising computer-executable instructions represented by the encoder operation manager 222. However, all or part of such encoding functionality may also be implemented partially or entirely in hardware as an electronic circuit.

Note that one or more general purpose or special purpose computing systems/devices may be used to operate the encoder 118, store information regarding the encoder 118, store digital video data, perform digital video encoding, store encoding strategies, convert digital video frames to data objects, extract features represented by the digital video frames and communicate with the video sources 104, encoding model library 122, and the simulator 138. In addition, the encoder 118 may comprise one or more distinct computing systems/devices and may span distributed locations. Furthermore, each block shown may represent one or more such blocks as appropriate to a specific embodiment or may be combined with other blocks. Also, the encoder operation manager 222 may be implemented in software, hardware, firmware, or in some combination to achieve the capabilities described herein.

In the embodiment shown, encoder 118 may comprise a computer memory ("memory") 201, a display 202 (including, but not limited to a light emitting diode (LED) panel, cathode ray tube (CRT) display, liquid crystal display (LCD), touch screen display, etc.), one or more Central Processing Units ("CPU") 203, Input/Output devices 204 (e.g., keyboard, mouse, RF or infrared receiver, universal serial bus (USB) ports, other communication ports, and the like), other computer-readable media 205, and network connections 206. The encoder operation manager 222 is shown residing in memory 201. In other embodiments, some portion of the contents and some, or all, of the components of the encoder operation manager 222 may be stored on and/or transmitted over the other computer-readable media 205. The components of the encoder 118 and operation manager 222 preferably execute on one or more CPUs 203 and facilitate the receiving, processing, feature extraction, observation, communication over communication system 108, and encoding of sequences of digital video frames as described herein. The encoder operation manager 222 may also facilitate on-demand media services (e.g., VOD services), on-demand program ordering, processing and DRM and key management and storage corresponding to processing received streaming media content and other programming. The encoder operation manager 222 may operate as, be part of, or work in conjunction and/or cooperation with various on-demand service software applications stored in memory 201. The encoder operation manager 222 also facilitates communication with peripheral devices, via the I/O devices 204 and with remote systems (e.g., the video sources 104, encoding model library 122, and the simulator 138) via the network connections 206.

Programming received as streaming media content or other types of programming and/or digital video content may reside on video storage 216, either in decrypted or encrypted form, as applicable for storing, encoding and otherwise processing the received digital video frames according to the applicable particular encoding strategy. The video storage 216 may also store various program metadata associated with the programming stored in video storage 215, such as that including, but not limited to, DRM data, tags, codes, identifiers, format indicators, timestamps, user identifications, authorization codes, digital signatures, etc.

The feature extraction module 224 may extract various features from the plurality of different sequences of digital video frames received from the video sources by the encoder operation manager 222. The feature extraction module 224 may be part of or work in conjunction with various on-demand service (e.g., VOD) software applications used to enable a user to receive streaming media content programs and other programming via the encoder 118. The observation module 228 may be configured to identify the various features extracted by the feature extraction module 224 as being one or more features associated with the identified type of content of the received sequence of digital video frames and communicate these observations to the encoding model library 122 such that the encoding model library 122 can determine the encoding strategy particularly suitable for encoding one or more features associated with the identified type of content and communicate this back to the video encoding engine 226. The video encoding engine 226 then encodes the received sequence of video frames using the video encoding strategy selected by the encoding model library 122 and previously saved in the encoding model library 122 for being particularly suitable for encoding the sequence of digital video frames.

In some embodiments, the video encoding engine 226 is configured to encode the sequence of digital video frames as they are being received by the encoder 118, using the video encoding strategy selected by and stored in the encoding model library 122 according to video on demand software also residing in memory 201 or other programs 230 residing in memory 201. The video encoding engine 226 may also format, translate, perform digital signal processing, adjust data rate and/or complexity or perform other processing on the data representing the digital video content as applicable for communicating the received content in real time over the communication system as it is being received by the encoder 118.

Other code or programs 230 (e.g., further audio/video processing modules, a user interface module, a Web server, and the like), and potentially other data repositories, such as data repository 220 for storing other data (user profiles, preferences and configuration data, etc.), also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the encoder 118 and encoder operation manager 222 include an application program interface ("API") that provides programmatic access to one or more functions of the encoder 118 and encoder operation manager 222. For example, such an API may provide a programmatic interface to one or more functions of the encoder operation manager 222 that may be invoked by one of the other programs 230, the video sources 104, encoding model library 122, the simulator 138, or some other module. In this manner, the API may facilitate the development of third-party software, such as various different on-demand service applications, user interfaces, plug-ins, adapters (e.g., for integrating functions of the encoder operation manager 222 and simulator 138 into desktop or remote applications), and the like to facilitate systems and methods for enhanced video encoding using the encoder 118 locally or via cloud computing platforms.

In an example embodiment, components/modules of the encoder 118 and encoder operation manager 222 are implemented using standard programming techniques. For example, the encoder operation manager 222 may be implemented as a "native" executable running on the CPU 203, along with one or more static or dynamic libraries. In other embodiments, the encoder 118 and encoder operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the encoder 118 to perform the functions of the encoder operation manager 222. In one embodiment, instructions cause the CPU 203 or some other processor, such as an I/O controller/processor, to receive sequences of digital video frames with or in conjunction with receiving a request for a streaming media content according to on-demand service software applications running on the encoder 118 or remote systems in communication with the encoder over communication system 108. The instructions cause the CPU 203 or some other processor, such as an I/O controller/processor, to receive, process and encode the requested streaming media program using the selected video encoding strategy.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer (e.g., Bluetooth® wireless technology providing a communication channel between the encoder 118 and the video sources 104, encoding model library 122, the simulator 138, or some other module), running on one or more computer systems each having one or more CPUs or other processors. Some embodiments may execute concurrently and asynchronously, and communicate using message passing techniques. Equivalent synchronous embodiments are also supported by an encoder operation manager 222 implementation. Also, other functions could be implemented and/or performed by each component/module, and in different orders, and by different components/modules, yet still achieve the functions of the encoder 118 and encoder operation manager 222.

In addition, programming interfaces to the data stored as part of the encoder 118 and encoder operation manager 222, can be available by standard mechanisms such as through C, C++, C#, and Java APIs; libraries for accessing files, databases, or other data repositories; scripting languages such as XML; or Web servers, FTP servers, or other types of servers providing access to stored data. The video storage 216 and other data 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the encoder operation manager 222.

Furthermore, in some embodiments, some or all of the components of the encoder 118 and encoder operation manager 222 may be implemented or provided in other manners, such as at least partially in firmware and/or hardware, including, but not limited to one or more application-specific integrated circuits ("ASICs"), standard integrated circuits, graphics processors, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; solid state drive; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

One or more functions and/or components of the encoder 118 (e.g., a CPU, memory and network connections) may also comprise, be part of, or be operably included in the simulator 138, video sources 104 and/or the encoding model library as applicable to implement the various functionality of those devices described herein. For example, the simulator 138 may also include a corresponding encoder, operation manager, CPU and memory that performs the encoding simulations of that device described herein.

Figure 3:
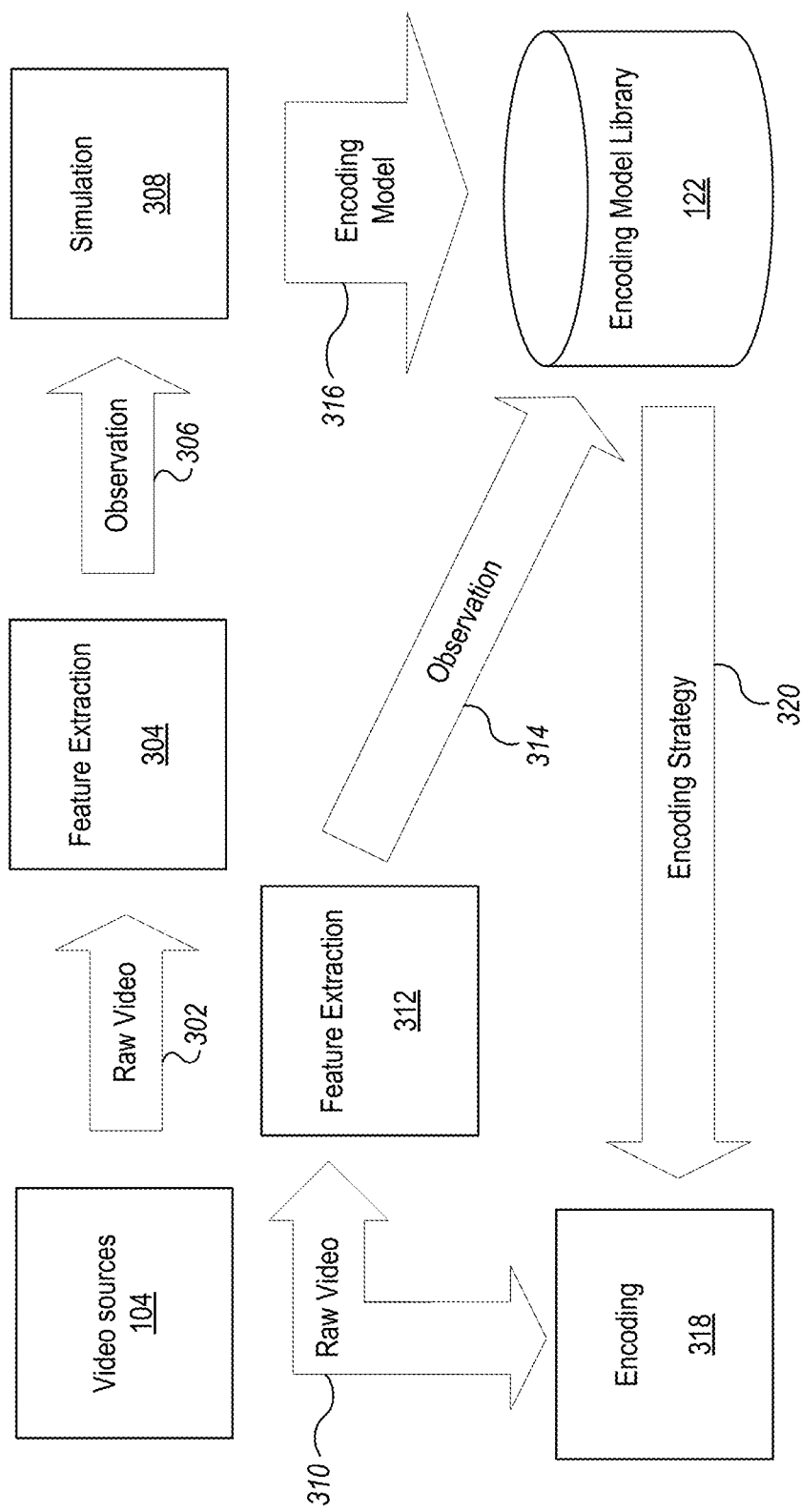
FIG. 3 is a block diagram of a data flow process used in systems and methods for enhanced video encoding, according to one example embodiment.

FIG. 3 is a block diagram of a data flow process used in systems and methods for enhanced video encoding, according to one example embodiment. Such a process as shown in FIG. 3 and described below is an example of a process that may be performed by the system shown in FIG. 2, including video sources 104, encoder 118, simulator 138 at the encoding model library 122 shown in FIG. 2 and described herein.

For the machine learning simulation process, video sources 104 feed raw video 302 as sequences of non-encoded digital video frames to a feature extraction process 304. The feature extraction process 304 may extract various features (i.e., informative characteristics) from the raw video 302 represented by a plurality of different sequences of digital video frames received from the video sources 104 by detecting patterns in one or more digital video frames in the sequence of received digital video frames. In particular, a "feature" may be anything of interest in a video: a building, a tree, a mountain, a face, a car, a specific type of car, a license plate, a crowd of people, an animal, a specific type of animal, etc. Feature extraction refers to detecting a feature in a frame and then extracting it as a data object. Feature tracking refers to tracking the motion, shape, appearance of a given feature from one video frame to the next. Feature tracking may also be performed in the feature extraction process 304, such that the system may "follow" or track some features from frame to frame. In some embodiments, such features may indicate a type of content that the sequence of digital video frames represents.

For example, the feature extraction process 304 may involve detecting that a representation of a baseball is present throughout the sequence of digital video frames received from the video sources 104, which may indicate to the system that the type of content of the sequence of digital video frames is baseball or sports. This feature is then converted to a data object that can be communicated as an observation 206 to the simulation process 308. The observation may be a data object representing the feature itself and/or an association of the feature with a particular type of content. The observation may also or instead be data that the simulation process 308 can use to detect whether the same sequence of video frames has been processed before.

Various technological tools are available for performing feature extraction, which include, but are not limited to, software libraries for video content extraction. Such components extract relevant features of video data and can be reused by different applications. The software may provide an object model that includes components for video data modeling and tools for processing and extracting video content. Some examples of feature extraction tools are available from www.github.com and include fastvideofeat, which is a motion feature extractor based on motion vectors from video compression information. The second example is a fast Fisher vector computation tool, fastfv, that uses vector Streaming SIMD Extensions 2 (SSE2) CPU instructions. Many other data analysis software packages provide for feature extraction and dimension reduction. Common numerical programming environments such as MATLAB, SciLab, NumPy and the R language provide feature extraction techniques (e.g., principal component analysis) via built-in commands.

The simulation process 308 then receives these observations, which may include all or a portion of the raw digital video frames and encodes the video data using various different encoding strategies and compares the results to find the relative best encoding strategy for each received sequence of frames according to various possible criteria. For example, it may be desirable for encoding digital video of a sports event to have the process encode motion well but not necessarily exact colors, while it may be desirable for encoding a video of an art exhibit for the process to encode color and surface texture well. The simulation process 308 may also associate the type of content identified by the extracted features with the encoding strategy that resulted in the relative best result for that sequence of video frames. The simulation process 308 may then track and thus learn which encoding strategies tend to have better results for particular a type of content after having encoded multiple sequences of video frames having same or similar types of content. Also, the simulation process 308 may track and thus learn which encoding strategies tend to have better results for various different types of content after having encoded multiple sequences of video frames having different types of content. Additionally, the simulation process 308 may track and thus learn which encoding strategies tend to have better results for the same sequence of video frames after having encoded the same sequence of video frames using different encoding strategies and comparing the results.

As an example, in one embodiment, the simulation process 308 saves the results of encoding one or more features associated with the identified type of content of the raw video 302 using the various different encoding strategies. The simulation process then compares, using predetermined criteria, the results of encoding the features associated with the identified type of content using the various different encoding strategies and then selects, based on the predetermined criteria, one of the various different encoding strategies used to encode the plurality of different sequences of digital video frames as the encoding strategy particularly suitable for encoding the features associated with the identified type of content. This is based on the comparison of the results of encoding the features associated with the identified type of content. For example, the various different encoding strategies include, but are not limited to: reducing color range, uniform or targeted sharpness reduction, frame duplication and proactive bandwidth allocation. Thus, the corresponding predetermined criteria used to compare the results may include, but are not limited to, criteria regarding measurements related to one or more of: reduction of color range, uniform or targeted sharpness reduction, frame duplication and proactive bandwidth allocation.

The simulation process 308 then communicates this information regarding which type or types of content for which an encoding strategy is particularly suitable along with that particular encoding strategy 316 to the encoding model library 122. The simulation process 308 may also or instead communicate to the encoding model library 122 information indicating which encoding strategy is particularly suitable for encoding a specific sequence of digital video frames or program content along with communicating that particular encoding strategy 316 to the encoding model library 122. Thus, a machine learning process may occur by training the system by performing the above described simulation process 308 on the same sequence of video frames, the same content and/or the same features (or on video having the same type of content and/or type of features) using various different encoding strategies and by performing the above described simulation process 308 on many different types of video content represented by many different sequences of digital video frames that include various different features.

After or in parallel with the machine learning simulation process 308 described above, raw digital video 310 may be communicated from the video sources 104 to the real-time encoding system including the feature extraction process 312 and encoding process 318. This real-time encoding process has the benefit of the previous simulation process 308 and access to the resulting particularly suitable encoding strategies previously stored in the encoding model library 122. For example, the encoding process 318 may receive raw video 310 from the video sources 104 as sequences of digital video frames while the same raw video 310 is fed to the feature extraction process 312. Before the encoding process 318 encodes the raw video 310, the feature extraction process 312 extracts features from the raw video 310 in a same or similar manner described above with respect to the feature extraction process 304 and provides the corresponding observation data 314 to the encoding model library 122.

Using the observation data 314, which may include the extracted features of the raw video 310 and/or associations of the extracted features with one or more types of content, the encoding model library 122 then determines that the identified type of content shown throughout the sequence of video frames of the raw video 310 has been previously processed by either the simulation process or the encoding process 318 of the video encoding system. This is based on comparing the observation data 314 with the previous observation data 306, encoding model information 316 and/or previous observation data 314 received by the encoding model library 122 through the machine learning process described herein. The encoding model library 122 then selects a video encoding routine previously used to encode one or more features associated the identified type of content and previously saved in the encoding model library 122 for being particularly suitable for encoding the one or more features associated with the identified type of content.

As another example embodiment, the encoding model library 122 may determine that the same content (i.e., same sequence of digital video frames) has been previously processed by the video encoding system, either by the simulation process 308 or the real-time encoding process 318. In response to determining that the same sequence of digital video frames has been previously processed by the video encoding system, the encoding model library 122 selects a video encoding strategy previously used to encode that same content. This video encoding strategy is an encoding strategy that had been previously saved by the video encoding system in the encoding model library 122 for being particularly suitable for encoding that same content.

The encoding model library 122 then communicates the selected encoding strategy 320 to the encoding process 318, which the encoding process 318 then uses to encode the raw video 310 received from the video sources. Having the encoding strategy that is particularly suitable for encoding the same content or same type of content already saved and available in the encoding model library 122 thus saves time and bandwidth and is more efficient for real-time encoding as compared to, for example, multi-pass encoding.

Figure 4:
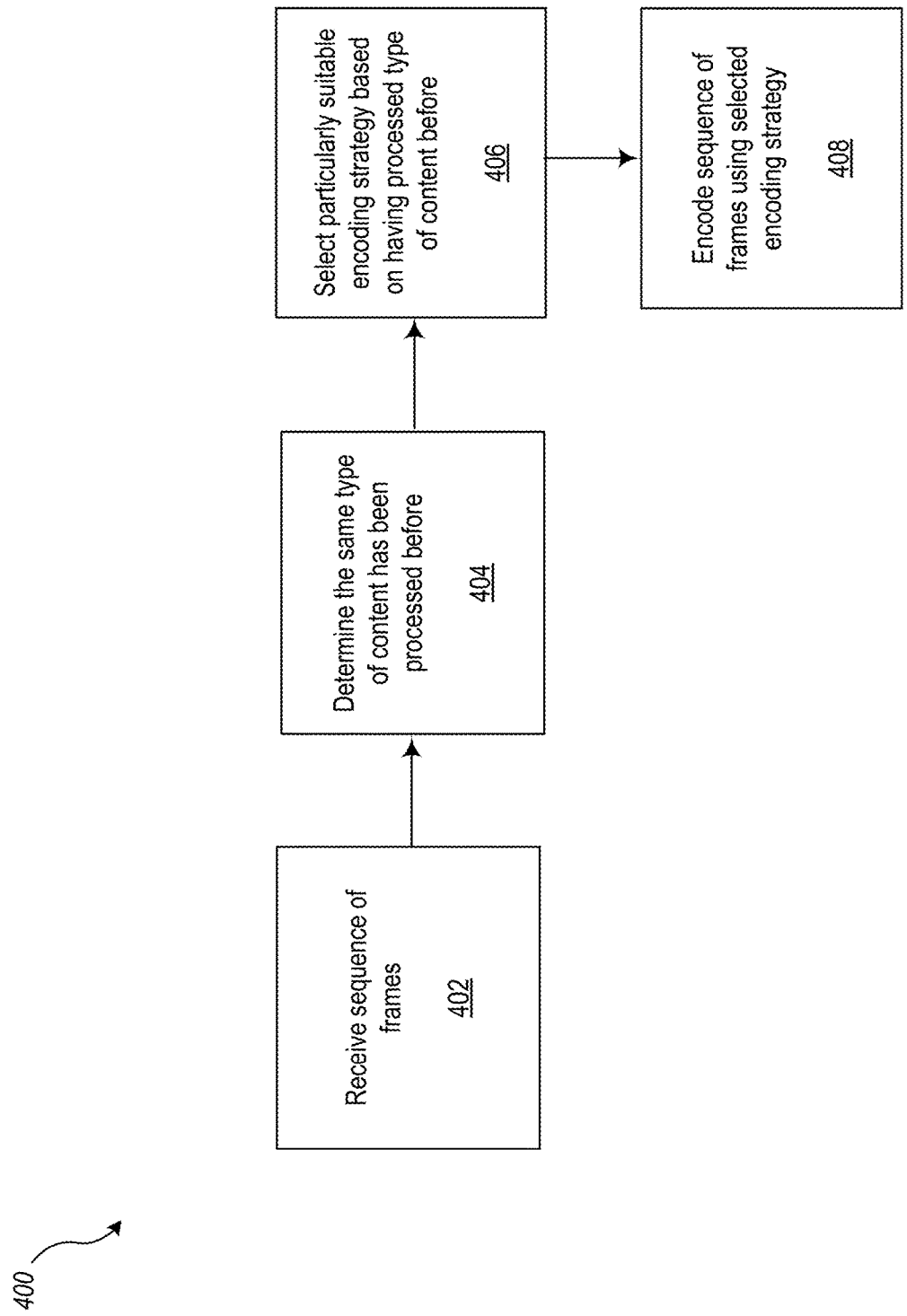
FIG. 4 is a flow diagram of a method of enhanced video encoding involving determining the same type of content has been processed before, according to one example embodiment.

FIG. 4 is a flow diagram of a method 400 of enhanced video encoding involving determining the same type of content has been processed before, according to one example embodiment.

At 402, the video encoding system receives a sequence of digital video frames;

At 404, the video encoding system determines whether an identified type of content shown throughout the sequence of video frames has been previously processed by the video encoding system.

At 406, the video encoding system, in response to the video encoding system determining that the identified type of content shown throughout the sequence of video frames has been previously processed by the video encoding system, selects a video encoding strategy previously used to encode one or more features associated the identified type of content. The selected video encoding strategy was previously saved by the video encoding system for being particularly suitable for encoding the one or more features associated the identified type of content.

At 408, the video encoding system encodes the sequence of video frames using the selected video encoding strategy previously saved by the video encoding system for being particularly suitable for encoding the one or more features associated the identified type of content.

Figure 5:
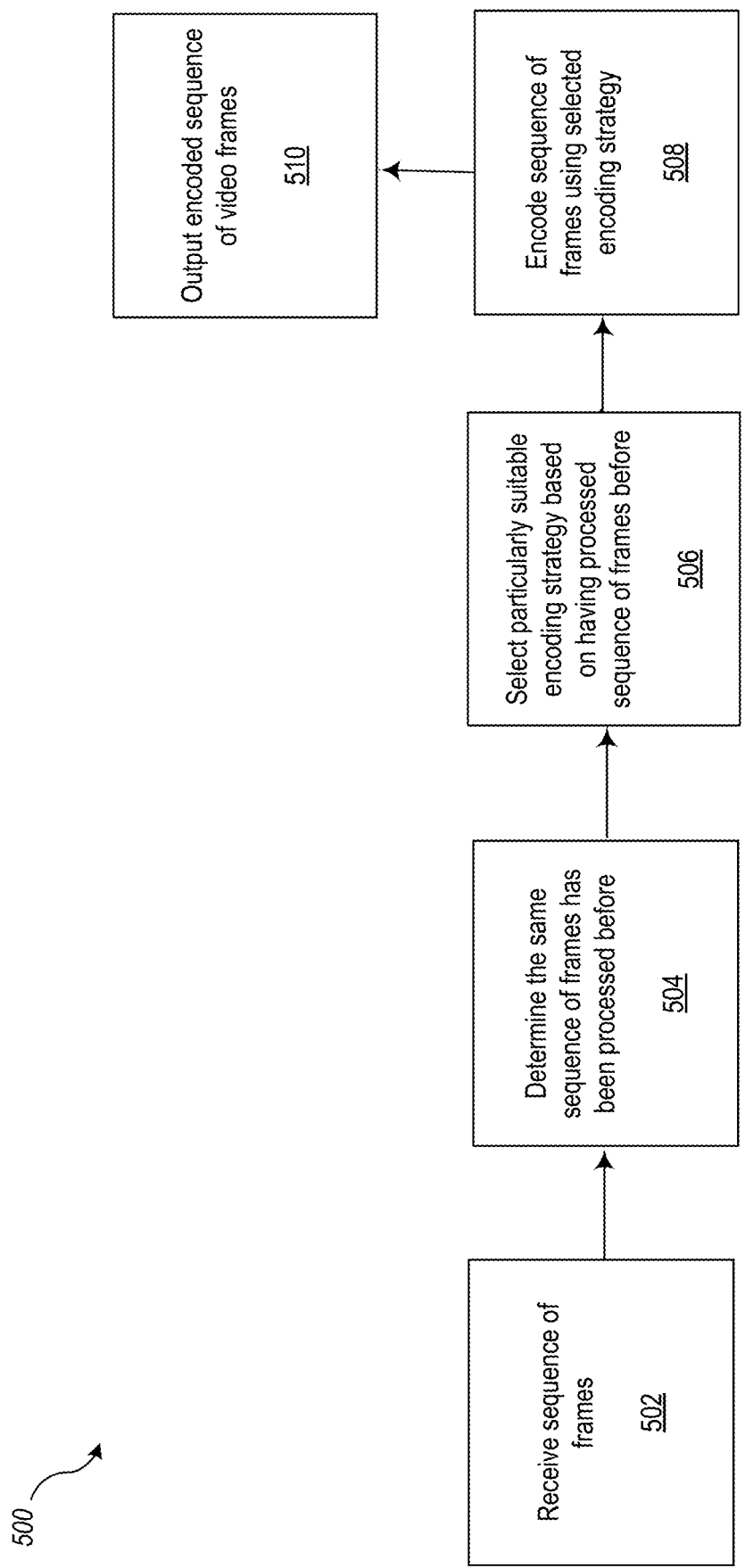
FIG. 5 is a flow diagram of a method of enhanced video encoding involving determining the same content has been processed before, according to one example embodiment.

FIG. 5 is a flow diagram of a method 500 of enhanced video encoding involving determining the same content has been processed before, according to one example embodiment.

At 502, the video encoding system receives a sequence of digital video frames;

At 504, the video encoding system determines that the sequence of digital video frames has been previously processed by the video encoding system.

At 506, the video encoding system, in response to determining that the sequence of digital video frames has been previously processed by the video encoding system, selects a video encoding strategy previously used to encode the sequence of digital video frames. The selected video encoding strategy was previously saved by the video encoding system for being particularly suitable for encoding the sequence of digital video frames.

At 508, the video encoding system encodes the sequence of video frames using the selected video encoding strategy previously saved by the video encoding system for being particularly suitable for encoding the sequence of digital video frames.

At 510, the video encoding system outputs the sequence of video frames encoded using the selected video encoding strategy.

Figure 6:
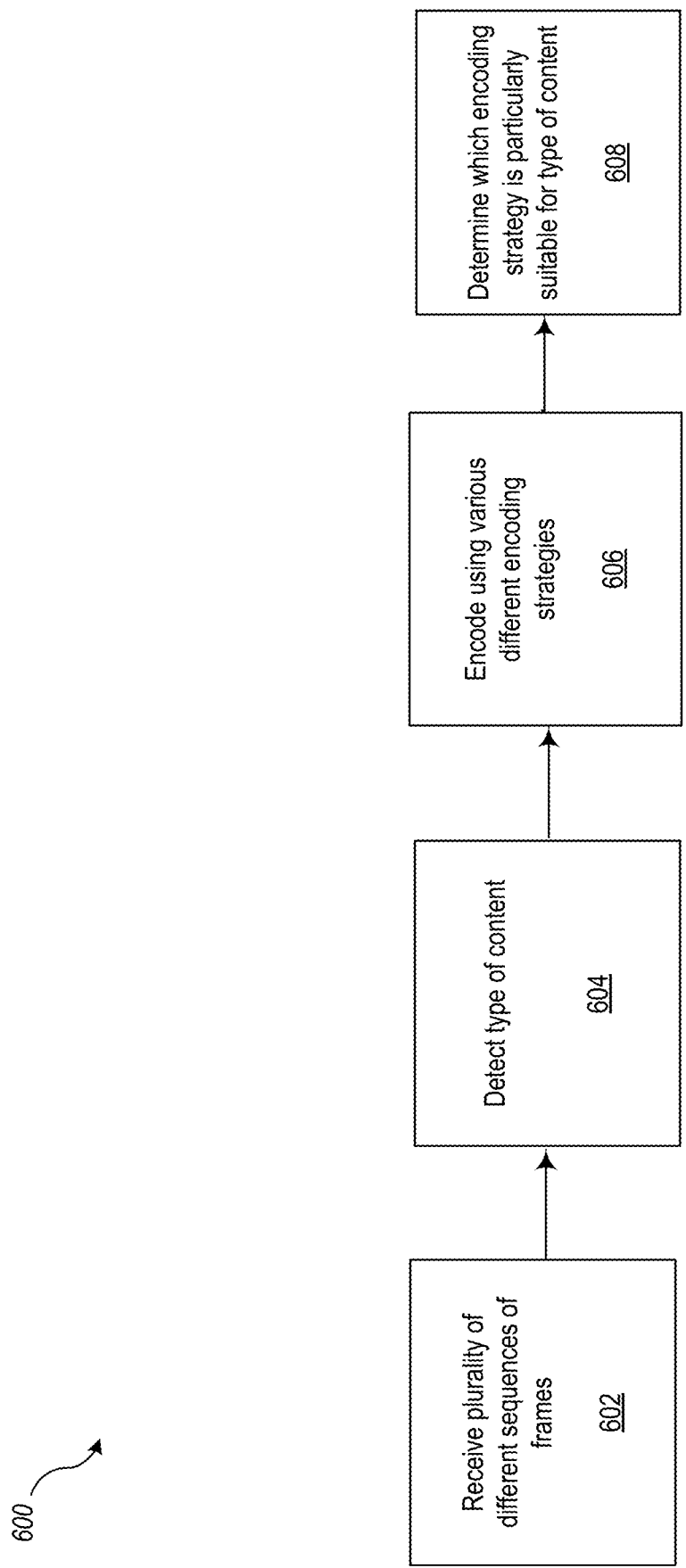
FIG. 6 is a flow diagram of a method of enhanced video encoding involving training a machine learning system by encoding video using various different encoding strategies, according to one example embodiment.

FIG. 6 is a flow diagram of a method 600 of enhanced video encoding involving training a machine learning system by encoding video using various different encoding strategies, according to one example embodiment.

At 602, the video encoding system receives, by a machine learning module of a digital video encoding system, a plurality of different sequences of digital video frames.

At 604, the video encoding system detects, by the machine learning module of the digital video encoding system, a type of content of the plurality of different sequences of digital video frames as an identified type of content.

At 606, the video encoding system encodes, by the machine learning module of the digital video encoding system, the plurality of different sequences of digital video frames using various different encoding strategies.

At 608, the video encoding system determines, by the machine learning module of the digital video encoding system, that one of the various different encoding strategies is the encoding strategy particularly suitable for encoding the one or more features associated with the identified type of content.

Figure 7:
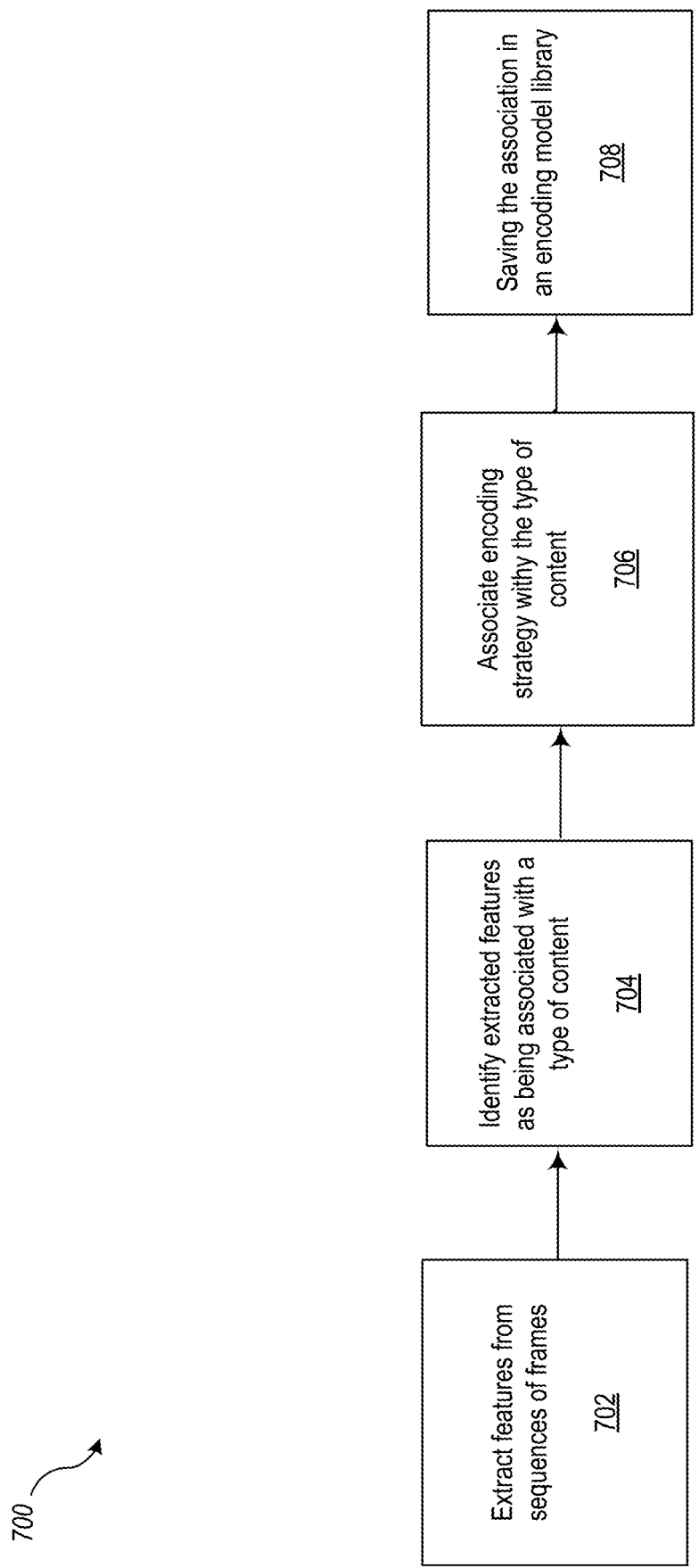
FIG. 7 is a flow diagram of a method used in enhanced video encoding involving identification of extracted features as being associated with a type of content, according to one example embodiment.

FIG. 7 is a flow diagram of a method 700 used in enhanced video encoding involving identification of extracted features as being associated with a type of content, according to one example embodiment.

At 702, the video encoding system extracts various features from a plurality of different sequences of digital video frames.

At 704, the video encoding system identifies the extracted various features as being one or more features associated with an identified type of content.

At 706, the video encoding system associates with the identified type of content the encoding strategy particularly suitable for encoding the one or more features associated with the identified type of content.

At 708, the video encoding system saves in an encoding library the association of the identified type of content with the encoding strategy particularly suitable for encoding the one or more features associated with the identified type of content. The video encoding system may also save in the encoding model library the encoding strategy particularly suitable for encoding the one or more features associated with the identified type of content.

While various embodiments have been described herein above, it is to be appreciated that various changes in form and detail may be made without departing from the spirit and scope of the invention(s) presently or hereafter claimed.

The invention claimed is:

1. A method in a digital video encoding system, the method comprising:
    receiving, by a digital video encoder of the video encoding system, a sequence of digital video frames;
    determining, by the video encoding system, that the sequence of video frames has been previously processed by the video encoding system;
    in response to the video encoding system determining that the sequence of video frames has been previously processed by the video encoding system, selecting, by the video encoding system, a video encoding strategy previously used to encode the sequence of video frames and previously saved by the video encoding system for being particularly suitable for encoding the sequence of video frames; and
    encoding, by the digital video encoder, the sequence of video frames using the selected video encoding strategy previously saved by the video encoding system for being particularly suitable for encoding the sequence of video frames.

2. The method of claim 1 further comprising:
    before encoding the sequence of video frames using the selected video encoding strategy previously saved by the video encoding system for being particularly suitable for encoding the sequence of video frames:
        receiving, by a machine learning module of the digital video encoding system, a plurality of different sequences of digital video frames;
        detecting, by the machine learning module of the digital video encoding system, a type of content of the plurality of different sequences of digital video frames as an identified type of content shown throughout the sequence of video frames;
        encoding, by the machine learning module of the digital video encoding system, the plurality of different sequences of digital video frames using various different encoding strategies;
        determining, by the machine learning module of the digital video encoding system, that one of the various different encoding strategies is an encoding strategy particularly suitable for encoding one or more features associated with the identified type of content;
        associating, by the machine learning module of the digital video encoding system, with the identified type of content the encoding strategy particularly suitable for encoding the one or more features associated with the identified type of content;
        saving in an encoding library, by the machine learning module of the digital video encoding system, the association of the identified type of content with the encoding strategy particularly suitable for encoding the one or more features associated with the identified type of content; and
        saving in the encoding model library, by the machine learning module of the digital video encoding system, the encoding strategy particularly suitable for encoding the one or more features associated with the identified type of content.

3. The method of claim 2 wherein the detecting a type of content of the plurality of different sequences of digital video frames as the identified type of content includes:
    extracting various features from the plurality of different sequences of digital video frames; and
    identifying the extracted various features as being the one or more features associated with the identified type of content.

4. The method of claim 3 wherein the various features are representations of physical objects throughout plurality of different sequences of digital video frames associated with the identified type of content.

5. The method of claim 4 wherein the physical objects include one or more objects associated with sports and the identified type of content is sports.

6. The method of claim 5 wherein the physical objects include one or more of: a baseball, a bat, a basketball, a football, a football helmet, a soccer ball, a stadium, a large crowd of people.

7. The method of claim 2 wherein the determining that one of the various different encoding strategies is the encoding strategy particularly suitable for encoding the one or more features associated with the identified type of content includes:
    saving results of encoding the one or more features associated with the identified type of content from the encoding of the plurality of different sequences of digital video frames using the various different encoding strategies;
    comparing, using predetermined criteria, the results of encoding the one or more features associated with the identified type of content from the encoding of the plurality of different sequences of digital video frames using the various different encoding strategies; and
    selecting, based on the predetermined criteria, one of the various different encoding strategies used to encode the plurality of different sequences of digital video frames as the encoding strategy particularly suitable for encoding the one or more features associated with the identified type of content based on the comparison of, using the predetermined criteria, the results of encoding the one or more features associated with the identified type of content.

8. The method of claim 7 wherein the predetermined criteria are regarding measurements related to one or more of: reduction of color range, uniform or targeted sharpness reduction, frame duplication, proactive bandwidth allocation.

9. The method of claim 2 wherein the various different encoding strategies include two or more of: reducing color range, uniform or targeted sharpness reduction, frame duplication, proactive bandwidth allocation.

10. A digital video encoding system comprising:
    at least one processor; and
    at least one memory coupled to the at least one processor having computer executable instructions stored thereon that, when executed, cause the at least one processor to:
        receive a sequence of digital video frames;
        determine that the sequence of digital video frames has been previously processed by the video encoding system;
        in response to determining that the sequence of digital video frames has been previously processed by the video encoding system, select a video encoding strategy previously used to encode the sequence of digital video frames, the video encoding strategy previously saved by the video encoding system for being particularly suitable for encoding the sequence of digital video frames;

encode the sequence of video frames using the selected video encoding strategy previously saved by the video encoding system for being particularly suitable for encoding the sequence of digital video frames; and output the sequence of video frames encoded using the selected video encoding strategy.

11. The system of claim 10 wherein the computer executable instructions, when executed, further cause the at least one processor to:

before encoding the sequence of video frames using the selected video encoding strategy previously saved by the video encoding system for being particularly suitable for encoding the sequence of video frames:

receive a plurality of sequences of digital video frames on multiple different occasions;

detect that each of the plurality of sequences of digital video frames is the same sequence of digital video frames;

encode the plurality of different sequences of digital video frames using various different encoding strategies; and determine that one of the various different encoding strategies is the encoding strategy particularly suitable for encoding the same sequence of digital video frames;

associate the encoding strategy particularly suitable for encoding the same sequence of digital video frames with the same sequence of digital video frames;

save in an encoding library the association of the encoding strategy particularly suitable for encoding the same sequence of digital video frames with the same sequence of digital video frames; and save in the encoding model library the encoding strategy particularly suitable for encoding the same sequence of digital video frames.

12. The system of claim 11 wherein the detection that each of the plurality of sequences of digital video frames is the same sequence of digital video frames includes:

comparison of the plurality of different sequences of digital video frames to each other; and determining that the plurality of sequences of digital video frames is the same sequence of digital video frames based on the comparison of the plurality of different sequences of digital video frames to each other.

13. The system of claim 12 wherein the determining that one of the various different encoding strategies is the encoding strategy particularly suitable for encoding the same sequence of digital video frames includes:

saving results of encoding the plurality of different sequences of digital video frames using various different encoding strategies;

comparing, using predetermined criteria, the results of encoding the plurality of different sequences of digital video frames using various different encoding strategies; and selecting, based on the predetermined criteria, one of the various different encoding strategies used to encode the plurality of different sequences of digital video frames as the encoding strategy particularly suitable for encoding the same sequence of digital video frames based on the comparison of, using the predetermined criteria, the results of encoding the plurality of different sequences of digital video frames using various different encoding strategies.

14. The system of claim 13 wherein the predetermined criteria are regarding measurements related to one or more of: reduction of color range, uniform or targeted sharpness reduction, frame duplication, proactive bandwidth allocation.

15. The system of claim 11 wherein the various different encoding strategies include two or more of: reducing color range, uniform or targeted sharpness reduction, frame duplication, proactive bandwidth allocation.

* * * * *